United States Patent
Manson

(10) Patent No.: US 9,458,522 B2
(45) Date of Patent: Oct. 4, 2016

(54) METHOD FOR RECOVERY OF THE CONSTITUENT COMPONENTS OF LATERITES

(71) Applicant: AluChem Companies, Inc., Cincinnati, OH (US)

(72) Inventor: Ian Manson, Cincinnati, OH (US)

(73) Assignee: AluChem, Inc., Cincinnati, OH (US)

( * ) Notice: Subject to any disclaimer, the term of this patent is extended or adjusted under 35 U.S.C. 154(b) by 238 days.

(21) Appl. No.: 14/255,791

(22) Filed: Apr. 17, 2014

(65) Prior Publication Data

US 2015/0299820 A1  Oct. 22, 2015

(51) Int. Cl.

| | |
|---|---|
| *C22B 3/08* | (2006.01) |
| *C22B 3/46* | (2006.01) |
| *C22B 3/14* | (2006.01) |
| *C22B 34/12* | (2006.01) |
| *C22B 21/00* | (2006.01) |
| *C22B 26/22* | (2006.01) |
| *C22B 3/44* | (2006.01) |

(52) U.S. Cl.
CPC . *C22B 3/08* (2013.01); *C22B 3/14* (2013.01); *C22B 3/44* (2013.01); *C22B 3/46* (2013.01); *C22B 21/0015* (2013.01); *C22B 26/22* (2013.01); *C22B 34/125* (2013.01); *Y02P 10/234* (2015.11)

(58) Field of Classification Search
CPC .......... C22B 3/08; C22B 3/46; C22B 3/14; C22B 21/0015; C22B 34/125; C22B 26/22
See application file for complete search history.

(56) References Cited

U.S. PATENT DOCUMENTS

| | | | | |
|---|---|---|---|---|
| 8,728,437 B2 * | 5/2014 | Stuart | .................. | C01G 23/008 423/610 |
| 2008/0124260 A1 * | 5/2008 | Roche | .................. | C01G 23/008 423/83 |

FOREIGN PATENT DOCUMENTS

CN  103468978 A  * 12/2013

OTHER PUBLICATIONS

Du et al. CN 103468978 A published Dec. 2013. Machine translation.*

* cited by examiner

*Primary Examiner* — George Wyszomierski
*Assistant Examiner* — Tima M McGurthry Banks
(74) *Attorney, Agent, or Firm* — Blank Rome, LLP

(57) ABSTRACT

Digestion of a laterite ore with sulfuric acid dissolves all constituents except silica. The resulting sulfates—aluminum sulfate, ferric sulfate, titanyl sulfate, and magnesium sulfate—remain in solution at approximately 90° C. Hot filtration separates silica. Solution flow over metallic iron reduces ferric sulfate to ferrous sulfate. Controlled ammonia addition promotes hydrolysis and precipitation of hydrated titania from titanyl sulfate that is removed by filtration. Continued addition of ammonia forms ferrous ammonium sulfate and ammonium aluminum sulfate solutions. Alum is preferentially separated by crystallization. Ammonia addition to ammonium alum solution precipitates aluminum hydroxide, leaving ammonium sulfate in solution. The remaining iron rich liquor also contains magnesium sulfate. The addition of oxalic acid generates insoluble ferrous oxalate which is thermally decomposed to ferrous oxide and carbon monoxide which is used to reduce the ferrous oxide to metallic iron. Further oxalic acid addition precipitates magnesium oxalate which is thermally decomposed to magnesium oxide.

16 Claims, No Drawings

METHOD FOR RECOVERY OF THE CONSTITUENT COMPONENTS OF LATERITES

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

The present invention generally relates to the extraction of various components from mineral ores. More particularly, it relates to the separation of the components of laterites into commercially valuable materials.

2. Description of the Related Art Including Information Disclosed Under 37 CFR 1.97 and 1.98

Laterites are soil types rich in iron and aluminum, formed in hot and wet tropical areas. Nearly all laterites are rust-red in color due to the presence of iron oxides. They develop by intensive and long-lasting weathering of the underlying parent rock. Tropical weathering (laterization) is a prolonged process of chemical weathering which produces a wide variety in the thickness, grade, chemistry and ore mineralogy of the resulting soils. The majority of the land area containing laterites is located in a band extending about 25 degrees north and south of the Equator.

Historically, laterite was cut into brick-like shapes and used in monument building. Since the mid-1970's, trial sections of bituminous-surfaced low-volume roads have used laterite in place of stone as a base course. Thick laterite layers are porous and slightly permeable and thus the layers may function as aquifers in rural areas. Locally available laterites are used in an acid solution, followed by precipitation to remove phosphorus and heavy metals at sewage treatment facilities.

Laterites are a source of aluminum ore. The ore exists largely in clay minerals and the hydroxides, gibbsite, boehmite, and diaspore, which resembles the composition of bauxite. In Northern Ireland, they once provided a major source of iron and aluminum ores. Laterite ores also were the early major source of nickel.

Iron contamination can be a problem with regard to alumina recovery through acid digestion of alumina-rich earths or laterites. Crystallization routes almost always result in iron inclusions.

In a process according to the present invention, iron conversion to the ferrous form minimizes iron inclusions. Additionally, conversion of all iron to the ferrous form allows iron separation by precipitation as an oxalate.

Separation may be complete and the iron chemically pure. Multiple crystallizations from an ammonium alum avoid caking and other problems occurring when simple ammonium sulfate is crystallized and calcined. During development of the invention, the principal challenges were chemistry-related in terms of testing the reactions and finding the correct range of chemicals, temperatures, pH etc. to make the process work.

In the past, laterite separations have not been of much interest as a process for obtaining alumina. The usual approach has been to search for pure alumina feeds where possible, with minimal iron as a contaminant.

Thus, bauxite feeds have been dissolved in caustic soda (the Bayer process) rejecting all iron as the hydroxide (red mud). In a process according to the present invention, value may be derived from all of the constituents of laterite.

BRIEF SUMMARY OF THE INVENTION

The acid digestion of a laterite ore with sulfuric acid is used to dissolve all constituents except silica. The sulfates resulting from the digestion—aluminum sulfate, ferric sulfate, titanyl sulfate, and magnesium sulfate—remain in solution at approximately 90° C.

Hot filtration separates silica and any calcium content from the solution.

Solution flow over metallic iron reduces ferric sulfate to ferrous sulfate.

Controlled ammonia addition promotes hydrolysis and precipitation of hydrated titania from titanyl sulfate. This may be removed by hot filtration. Sulfuric acid is a byproduct.

Continued addition of ammonia (as ammonium sulfate) forms ferrous ammonium sulfate and ammonium aluminum sulfate solutions. The steep solubility curve of ammonium alum allows preferential separation by crystallization. Multiple crystallizations refine to extremely pure ammonium alum. Ammonia addition to ammonium alum solution precipitates aluminum hydroxide as a primary product, leaving ammonium sulfate in solution.

The remaining iron rich liquor may be adjusted to equimolar conditions with ammonia. This solution also contains magnesium sulfate. The addition of oxalic acid generates insoluble ferrous oxalate as the second major product. This may be filtered and washed. Sulfuric acid and ammonium sulfate solution are by-products.

The ferrous oxalate may be thermally decomposed to ferrous oxide and carbon monoxide. The carbon monoxide may be subsequently used to reduce the ferrous oxide to metallic iron.

Further oxalic acid addition to the process liquor precipitates magnesium oxalate leaving sulfuric acid by-product. The magnesium oxalate is thermally decomposed to magnesium oxide.

Ammonia may be added to neutralize all sulfuric acid generated in the various process stages and may be combined with directly produced ammonium sulfate streams. The alum solution may be sold as is, or crystallized to dry product for sale. Alternatively, alum crystals may be thermally decomposed to sulfuric acid and ammonia and recycled in the process.

In a process according to the invention, very pure streams of products are formed from the laterite constituent chemical makeup. Very low value materials may be cleanly separated to ultra-high purity products.

DETAILED DESCRIPTION OF THE INVENTION

The invention may best be understood by reference to the exemplary embodiment(s) described below.

It has been found that acid digestion of laterites with sulfuric acid may be used to dissolve all constituents except silica. Aluminum sulfate, ferric sulfate, titanyl sulfate, and magnesium sulfate remain in solution at approximately 90° C.

Hot filtration separates silica and any calcium content from the solution.

Solution flow over metallic iron reduces ferric sulfate to ferrous sulfate.

Controlled ammonia addition promotes hydrolysis and precipitation of hydrated titania from titanyl sulfate. This may be removed by hot filtration. Sulfuric acid is a byproduct.

Continued ammonia addition as sulfate forms ferrous ammonium sulfate and ammonium aluminum sulfate solutions. Ammonium aluminum sulfate, also known as ammonium alum or just alum, is a white crystalline double sulfate usually encountered as the dodecahydrate, formula $(NH_4)Al(SO_4)_2 \cdot 12H_2O$. The steep solubility curve of ammonium alum allows preferential separation by crystallization. Multiple crystallizations refine to extremely pure ammonium alum. Ammonia addition to ammonium alum solution precipitates aluminum hydroxide as a primary product, leaving ammonium sulfate in solution.

The remaining iron rich liquor may be adjusted to equimolar conditions with ammonia. The solution also contains magnesium sulfate. Addition of oxalic acid generates insoluble ferrous oxalate as the second major product. This may be filtered and washed.

Sulfuric acid and ammonium sulfate solution are by-products. Ferrous oxalate may be thermally decomposed to ferrous oxide and carbon monoxide. Carbon monoxide may be subsequently used to reduce the ferrous oxide to metallic iron.

Further oxalic acid addition to the process liquor precipitates magnesium oxalate leaving sulfuric acid by-product. Magnesium oxalate may be thermally decomposed to magnesium oxide.

Ammonia may be added to neutralize all sulfuric acid generated in the various process stages and may be combined with directly produced ammonium sulfate streams. The alum solution may be sold as is, or crystallized to dry product for sale. Alternatively, alum crystals may be decomposed to sulfuric acid and ammonia for recycle to process.

Process Feed Material

For one particular laterite from India, the chemical analysis was as follows:

| Component | Weight % | 1000 kg as mined |
|---|---|---|
| $Al_2O_3$ | 52.18 | 401.8 kg |
| $TiO_2$ | 3.57 | 27.5 kg |
| $Fe_2O_3$ | 39.29 | 302.5 kg |
| $SiO_2$ | 3.97 | 30.6 kg |
| MgO | 1.00 | 7.7 kg |
| Totals | 100.01% | 230.0 kg moisture |

Process Mass Balance
Digestion $$Al_2O_3 + 3H_2SO_4 + SiO_2 \rightarrow Al_2(SO_4)_3 + 3H_2O + SiO_2$$

$$TiO_2 + H_2SO_4 \rightarrow TiOSO_4 + H_2O$$

$$Fe_2O_3 + 3H_2SO_4 \rightarrow Fe_2(SO_4)_3 + 3H_2O$$

$$MgO + H_2SO_4 \rightarrow MgSO_4 + H_2O$$

Example 1

The 401.8 kilograms of aluminum oxide from the 1000-kg laterite ore sample may be digested by 1159.5 kilograms of sulfuric acid to produce 1348.3 kilograms of aluminum sulfate and 213.0 kilograms of water. The 30.6 kilograms of silica in the ore sample will remain undigested and may be separated by hot filtration.

The 27.5 kilograms of titanium dioxide from the 1000-kg laterite ore sample may be digested by 33.8 kilograms of sulfuric acid to produce 55.07 kilograms of titanium sulfate and 6.2 kilograms of water.

The 302.5 kilograms of ferric oxide from the 1000-kg laterite ore sample may be digested by 557.4 kilograms of sulfuric acid to produce 757.5 kilograms of ferric sulfate and 102.4 kilograms of water.

The 7.7 kilograms of magnesium oxide from the 1000-kg laterite ore sample may be digested by 18.7 kilograms of sulfuric acid to produce 23.0 kilograms of magnesium sulfate and 3.4 kilograms of water.

Note Regarding Iron Digestion

Iron separation from alumina in a process according to the invention depends upon the iron being in the ferrous form. Iron in laterites usually presents as ferric oxide (the hæmatite form of $Fe_2O_3$).

There is a small possibility that goethite FeO(OH) may also be present but acid digestion will produce a bulk of the ferric form of sulfate. This may be converted to ferrous sulfate by passing the hot digestion liquor through a bed of steel. This should be good quality scrap steel to minimize the introduction of impurities. The final stage of digestion prior to component separations thus may be the passage of the digestion liquor over iron. All ferric iron must be converted, so testing is critical.

$$Fe_2(SO_4)_3 + Fe \rightarrow 3FeSO_4$$

Example 2

The 757.5 kilograms of ferric sulfate produced in Example 1 may be passed through a bed of [scrap] steel where they may be reduced to 863.3 kilograms of ferrous sulfate while consuming 105.8 kilograms of iron.

Standard testing for the presence of ferric ions involves the use of potassium ferricyanide. Any $Fe^{+3}$ ions will give a brown coloration but no precipitate. $Fe^{+2}$ forms a dark blue precipitate (Turnbull's blue). Potassium thiocyanate gives a deep red coloration to solutions with $Fe^{+3}$.

Aluminum Oxide

Ammonium sulfate addition to the digestion liquor forms both ammonium aluminum sulfate and ferrous ammonium sulfate. Solution cooling crystallizes the ammonium alum double salt while leaving the ferrous liquor in solution.

$$Al_2(SO_4)_3 + (NH_4)_2SO_4 + 24H_2O \rightarrow 2(NH_4Al(SO_4)_2 \cdot 12H_2O)$$

Example 3

The 1348.3 kilograms of aluminum sulfate from Example 1 may be reacted with 520.7 kilograms of ammonium sulfate and 1703.8 kilograms of water to produce 1869.1 kilograms of the ammonium alum double salt together with 1703.8 kilograms of water of hydration.

Multiple crystallizations may be effected to purify the crystal product.

Ammonia addition to the purified salt solution precipitates aluminum hydroxide.

$$NH_4Al(SO_4)_2 + 3NH_3 + 3H_2O \rightarrow Al(OH)_3 2(NH_4)_2SO_4$$

Example 4

The 1869.1 kilograms of the ammonium alum double salt from Example 3 may be reacted with 402.7 kilograms of ammonia and 426.0 kilograms of water to produce 614.8 kilograms of aluminum hydroxide and 2082.9 kilograms of ammonium sulfate.

Temperature, agitation speed, and rate of ammonia addition (as gas or hydroxide) have been found to affect the form of aluminum hydroxide precipitated. The precipitate may be washed, dried, and calcined to gamma alumina.

$$2Al(OH)_3 \rightarrow Al_2O_3 3H_2O$$

Example 5

The 614.8 kilograms of aluminum hydroxide from Example 4 may be calcined to produce 401.8 kilograms of alumina while liberating 213.0 kilograms of water.

The remaining digestion liquor will contain iron, and magnesium as sulfates, and ferrous ammonium sulfate.

Iron

Ammonia and/or ammonium sulfate additions may be made to the digestion liquor to provide equimolar ratios of ammonia and sulfate needed for the iron double salt precursor. Ammonium ion maintains a slightly acidic condition and inhibits ferrous conversion to ferric iron, particularly with a slight excess of sulfuric acid in solution.

$$FeSO_4 + (NH_4)_2SO_4 \rightarrow (NH_4)_2Fe(SO_4)_2$$

Example 6

The 863.3 kilograms of ferrous sulfate from Example 2 may be reacted with 751.0 kilograms of ammonium sulfate to produce 1614.3 kilograms of ferrous ammonium sulfate.

Oxalic acid may then be added to form insoluble ferrous oxalate.

$$(NH_4)_2Fe(SO_4)_2 + H_2C_2O_4 \cdot 2H_2O \rightarrow FeC_2O_4 \cdot 2H_2 + H_2SO_4 + (NH_4)_2SO_4$$

Example 7

The 1614.3 kilograms of ferrous ammonium sulfate from Example 6 may be reacted with 716.5 kilograms of oxalic acid to produce 817.9 kilograms of ferrous oxalate (with 204.8 kilograms of water of hydration), 557.4 kilograms of sulfuric acid and 751.0 kilograms of ammonium sulfate.

The pure salt obtained after washing may be dried and heated to decompose the oxalate.

$$FeC_2O_4 \cdot 2H_2O \rightarrow FeO + CO + CO_2 + 2H_2O$$

Example 8

The 817.9 kilograms of ferrous oxalate (containing 204.8 kilograms of water of hydration) may be decomposed by heating to yield 408.3 kilograms of ferrous oxide, 159.2 kilograms of carbon monoxide, 250.1 kilograms of carbon dioxide and 204.8 kilograms of water.

The ferrous oxide produced was finely divided and chemically active and must be reduced to metallic iron. Carbon monoxide released from the oxalate decomposition may be stored for subsequent use as a reducing agent to convert the iron oxide to iron.

$$FeO + CO \rightarrow Fe + CO_2$$

Example 9

The 408.3 kilograms of ferrous oxide from Example 8 may be reduced with 159.2 kilograms of carbon monoxide to yield 317.4 kilograms of metallic iron and 250.1 kilograms of carbon dioxide.

The fine particulate iron produced by the process is pyrophoric and should preferably be briquetted under an inert atmosphere before packaging for sale.

Magnesium Oxide

Solubility product data for iron and magnesium oxalates indicates that ferrous oxalate will precipitate before magnesium oxalate. Oxalic acid addition to the digestion liquor after iron removal may be used to precipitate the magnesium content:

$$MgSO_4 + H_2C_2O_4 \cdot 2H_2O \rightarrow MgC_2O_4 \cdot 2H_2O + H_2SO_4$$

Example 10

The 23.0 kilograms of magnesium sulfate in the digestion liquor of Example 1 may be treated with 24.1 kilograms of oxalic acid to precipitate 28.3 kilograms of magnesium oxalate while forming 18.7 kilograms of sulfuric acid.

The magnesium oxalate may be filtered, washed, dried and heated to decompose the oxalate and produce chemical grade active magnesia.

$$MgC_2O_4 \cdot 2H_2O \rightarrow MgO + CO + CO_2 + 2H_2O$$

Example 11

The 28.3 kilograms of magnesium oxalate from Example 10 may be decamped by heating to provide 7.7 kilograms of magnesia while liberating 5.3 kilograms of carbon monoxide, 8.4 kilograms of carbon dioxide and 6.9 kilograms of water.

Ammonium Sulfate

The ammonium sulfate produced in the processing is in the form of a solution that may be crystallized. The crystals may be sold as product or decomposed to sulfuric acid and ammonia.

$$(NH_4)_2SO_4 \rightarrow H_2SO_4 + NH_3$$

By way of example, the above-described process when applied to a 1000-kilogram batch of laterite will produce 1562.2 kilograms of ammonium sulfate which may be decomposed to 1159.5 kilograms of sulfuric acid and 402.7 kilograms of ammonia.

The decomposition reaction involves heating ammonium sulfate crystals in hot concentrated sulfuric acid, and has been described previously.

The quantities of acid and ammonia produced match the process requirements for digestion and crystallization exactly. Such 100 percent efficiency may not be practical but would assure minimum make-up requirements.

Chemical consumption and production figures for one particular process according to the invention are as follows:

Consumption

| Material | Quantity (in kilograms) |
| --- | --- |
| mined laterite | 1000 (770.0 kg oxide solids combined with 230.0 kg water) |
| sulfuric acid | 1159.5 |
| ammonia | 402.7 |
| scrap iron | 105.8 |
| oxalic acid | 740.6 |

Production

| Material | Quantity (in kilograms) |
| --- | --- |
| aluminum oxide | 401.8 |
| iron | 317.4 |
| silica | 30.6 |
| titanium dioxide | 27.5 |
| magnesium oxide | 7.7 |
| ammonium sulfate | 1562.2 (1159.5 kg sulfuric acid and 402.7 kg ammonia) |
| carbon monoxide | 5.3 (plus 159.2 kg from ferrous oxalate decomposition) |
| carbon dioxide | 508.6 (net, assuming use of 159.2 kg CO for iron reduction) |

Chemical consumption and production figures for one particular process according to the invention producing 1000 tonnes of alumina are as follows: (Note: as used herein, 1 tonne=1 metric ton=1,000,000 grams)

Consumption

| Material | Quantity (in tonnes) |
| --- | --- |
| laterite | 2489 |
| sulfuric acid | 2886 |
| ammonia | 1002 |
| scrap iron | 263 |
| oxalic acid | 1843 |

Production

| Material | Quantity (in tonnes) |
| --- | --- |
| alumina | 1000 |
| iron | 790 |
| silica | 76 |
| titania | 68 |
| magnesia | 19 |
| ammonium sulfate | 3888 |
| carbon monoxide | 13 |
| carbon dioxide | 1266 |

Note that the carbon dioxide produced is about 1.3 times the weight of laterite mined. More specifically, carbon dioxide production is 2.4 times the weight of iron content recoverable from mined material. Carbon dioxide is released by the decomposition of oxalates, and these may be sourced from oxalic acid. Oxalic acid may be manufactured using several chemical routes. The simplest, and oldest, chemical process involves the oxidation of carbohydrates using nitric acid. Sugars are decomposed to oxalic acid, and nitric acid decomposed to oxides of nitrogen. The oxides of nitrogen are absorbed in water to prepare fresh nitric acid for theoretical 100 percent acid recycle. The process is described in more detail below. Sugars are produced from plant material, directly as sugar, or via hydrolysis of plant starches. These natural feed materials grow using photosynthesis of carbon dioxide present in the atmosphere. This carbon dioxide may be returned to atmosphere when the oxalates decompose. Provided that sugar sourced oxalic acid is used, then the process is "green" or carbon neutral, and not a contributor to global warming.

Oxalic Acid

Oxalic acid may be used to convert all of the iron content in the laterite to pure iron. Scrap steel equal to half the weight of laterite iron may be used for the ferric to ferrous conversion and may be itself converted to pure iron. Iron manufactured using the process could be partially recycled for the ferric conversion, but scrap use may be preferable economically because it increases iron production by 50 percent for the same oxalic acid consumption. Oxalic acid is then a process critical chemical and consumed at a rate of approximately 3.5 times the weight of iron recoverable from the laterite.

Oxalic acid availability may be important and it may be worth considering on-site production. Proximity to agricultural cellulosic waste or refined sugar waste, or to sugar itself would allow relatively low cost oxalic acid manufacture. The sugar process may be the least expensive to implement for small scale production.

Starches consist of chains of glucose molecules, easily broken apart by acid hydrolysis (sulfuric acid and/or oxalic acid) into separate glucose molecules. The monosaccharides glucose and fructose are the preferred precursor for oxalic acid manufacture. Low-cost agricultural waste can be converted to glucose through acid digestion. The process may be simple or more complicated depending upon the means required to disrupt the waste materials (grinding, steam explosion etc.) prior to hydrolysis.

Conversion to oxalic acid may then proceed as follows:

$$4C_6H_{12}O_6 + 18HNO_3 + 3H_2O \rightarrow 12(COOH)_2 \cdot 2H_2O + 9N_2O$$

$$C_6H_{12}O_6 + 12HNO_3 \rightarrow 3(COOH)_2 \cdot 2H_2O + 3H_2O + 3NO + 9NO_2$$

Refined sucrose (as pure material through low-grade molasses) may be hydrolyzed to provide a good feed material for the manufacture of oxalic acid Equation balances show one unit of glucose producing 2.1 units of oxalic acid crystals. Processing and reaction inefficiencies may reduce the yield to, at worst, about 1.9 units of oxalic acid per unit of glucose feed. Vanadium pentoxide and ferric iron catalyze the reaction, which may be conducted in 50% sulfuric acid. Oxalic acid may be crystallized and the catalyzed mother liquor returned to the digestion stage.

Oxalic acid at 2027 tonnes (10% more than theoretical weight for 1000 tonnes of alumina made from Indian laterite) requires a glucose feed of 965 tonnes.

Nitric Acid Manufacture

The oxalic acid reaction was often conducted in less-developed countries at atmospheric pressure to maximize acid yield. It has been found that pressurized reactions, without air admission, maintain good conversions and offer the benefit of high pressure nitrogen oxides gas release. The oxides of nitrogen are themselves oxidized to nitrogen dioxide before absorption in water to form nitric acid. The reaction is self-pressurizing, through gas release, as the stirred reaction autoclave is heated to about 70° C. and nitric acid added gradually over 4 to 5 hours. High pressure oxides from the autoclave remove the need for expensive gas pressurization equipment and reduce the size and cost of a nitric acid plant considerably.

Temperature rises to about 75° C. in the course of the reaction and pressure may be held at about 150 p.s.i.g. This is a good combination for the gas feed to a nitric acid plant.

The generic equation for nitric acid need for the oxalic acid process is as follows.

$$C_6H_{12}O_6 + 6HNO_3 \rightarrow 3(COOH)_2 \cdot 2H_2O + 6NO$$

2025 tonnes of nitric acid may be used to oxidize 965 tonnes of glucose to 2026 tonnes of oxalic acid. 964 tonnes of NO should be generated. The NO may be oxidized to $NO_2$ in a nitric acid plant and absorbed in water. Secondary NO may be re-oxidized. Recycle efficiency can be very high. Dinitrogen tetroxide (nitrogen tetroxide) is the chemical compound $N_2O_4$. It forms an equilibrium mixture with nitrogen dioxide. Some call this mixture "dinitrogen tetroxide," while others call it "nitrogen dioxide."

$$2NO + O_2 \rightarrow 2NO_2 \leftrightarrows N_2O_4$$

964 tonnes of NO would require 514 tonnes of oxygen for conversion to 1478 tonnes of nitrogen dioxide.

$$3NO_2 + H_2O \rightarrow 2HNO_3 + NO \quad \text{(Stage 1)}$$

1478 tonnes of nitrogen dioxide would react with 193 tonnes of water to yield 1350 tonnes of nitric acid and 321 tonnes of nitric oxide.

The nitric oxide from Stage 1 may be returned for re-oxidation and recycle as $NO_2$ to the absorber.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A process for separating aluminum, iron, titanium, and magnesium from a laterite comprising:
    digesting the laterite in sulfuric acid to produce a first solution comprising aluminum sulfate, ferric sulfate, titanyl sulfate, and magnesium sulfate;
    passing the first solution over metallic iron to reduce the ferric sulfate to ferrous sulfate and produce a second solution;
    adding ammonia to the second solution to precipitate hydrated titania from the titanyl sulfate;
    filtering the second solution to remove the hydrated titania and produce a third solution;
    adding ammonium sulfate to the third solution to form a fourth solution comprising ferrous ammonium sulfate and ammonium aluminum sulfate;
    crystallizing ammonium aluminum sulfate from the fourth solution;
    dissolving the crystallized ammonium aluminum sulfate to form a fifth solution;
    adding ammonia to the fifth solution to precipitate aluminum hydroxide;
    adding ammonia or ammonium sulfate to the fourth solution to adjust to equimolar conditions to form a sixth solution;
    adding oxalic acid to the sixth solution to form insoluble ferrous oxalate;
    filtering the fifth solution to remove the ferrous oxalate and produce a seventh solution;
    adding oxalic acid to the seventh solution to precipitate magnesium oxalate;
    recovering magnesium oxalate from the seventh solution;
    heating the magnesium oxalate to form magnesium oxide;
    heating the ferrous oxalate to produce ferrous oxide and carbon monoxide; and,
    reducing the ferrous oxide to metallic iron.

2. The process recited in claim 1 further comprising:
    filtering the first solution to remove silica.

3. The process recited in claim 2 wherein the filtering is performed with the temperature of the first solution at about 90 degrees Celsius.

4. The process recited in claim 1 further comprising refining the ammonium aluminum sulfate using multiple crystallizations.

5. The process recited in claim 1 wherein reducing the ferrous oxide to metallic iron comprises contacting the ferrous oxide with carbon monoxide.

6. The process recited in claim 5 wherein the carbon monoxide comprises the carbon monoxide produced by the thermal decomposition of the ferrous oxalate.

7. The process recited in claim 5 wherein the carbon monoxide consists of the carbon monoxide produced by the thermal decomposition of the ferrous oxalate.

8. The process recited in claim 1 wherein the metallic iron over which the first solution is passed to reduce the ferric sulfate to ferrous sulfate comprises scrap iron.

9. The process recited in claim 1 further comprising washing, drying and calcining the aluminum hydroxide to produce gamma alumina.

10. The process recited in claim 1 further comprising washing, drying and calcining the hydrated titania to produce first amorphous and then anatase titania.

11. The process recited in claim 1 wherein the oxalic acid is produced by the oxidation of glucose with nitric acid.

12. The process recited in claim 11 wherein the oxidation of glucose with nitric acid produces nitric oxide which is then oxidized to nitrogen dioxide which is then absorbed in water to produce nitric acid.

13. The process recited in claim 1 wherein heating the magnesium oxalate to form magnesium oxide additionally forms carbon monoxide that is recycled to the process as a reducing agent for converting iron oxide to iron.

14. The process recited in claim 1 further comprising crystallizing ammonium sulfate produced when adding oxalic acid to the sixth solution to form insoluble ferrous oxalate.

15. The process recited in claim 14 further comprising decomposing the ammonium sulfate crystals in hot, concentrated sulfuric acid to produce ammonia and additional sulfuric acid.

16. The process recited in claim 15 further comprising recycling the ammonia to the process.

* * * * *